(12) United States Patent
Hörnquist

(10) Patent No.: US 11,363,173 B2
(45) Date of Patent: Jun. 14, 2022

(54) CAMERA AND A METHOD

(71) Applicant: Axis AB, Lund (SE)

(72) Inventor: Niclas Hörnquist, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/325,369

(22) Filed: May 20, 2021

(65) Prior Publication Data

US 2022/0006961 A1    Jan. 6, 2022

(30) Foreign Application Priority Data

Jul. 3, 2020 (EP) .................................... 20183955

(51) Int. Cl.
| | |
|---|---|
| *H04N 5/225* | (2006.01) |
| *G03B 17/55* | (2021.01) |
| *H04N 5/232* | (2006.01) |
| *G03B 17/02* | (2021.01) |
| *G03B 37/04* | (2021.01) |

(52) U.S. Cl.
CPC ......... *H04N 5/22521* (2018.08); *G03B 17/02* (2013.01); *G03B 17/55* (2013.01); *H04N 5/2252* (2013.01); *H04N 5/23216* (2013.01); *H04N 5/232411* (2018.08); *G03B 37/04* (2013.01)

(58) Field of Classification Search
CPC .... H04N 5/225; H04N 5/2251; H04N 5/2252; H04N 5/22521; H04N 5/2253; H04N 5/2254; H04N 5/2257; H04N 5/23216; H04N 5/23241; H04N 5/232411; H04N 7/18; G03B 17/08; G03B 17/55; G03B 37/04; G05D 22/00; G05D 22/02; G05D 27/00; G05D 27/02
See application file for complete search history.

(56) References Cited

U.S. PATENT DOCUMENTS

| | | | |
|---|---|---|---|
| 2011/0080516 A1* | 4/2011 | Yi ...................... | H04N 5/22521 348/308 |
| 2015/0181117 A1* | 6/2015 | Park ........................ | H04N 5/63 348/372 |

FOREIGN PATENT DOCUMENTS

| | | |
|---|---|---|
| EP | 3085071 A1 | 10/2016 |
| WO | 2015/094777 A1 | 6/2015 |
| WO | 2016/163160 A1 | 10/2016 |
| WO | WO-2016163160 A1 * | 10/2016 ............. B01D 53/26 |

OTHER PUBLICATIONS

Extended European Search Report dated Nov. 30, 2020 for European Patent Application No. 20183955.2.

* cited by examiner

*Primary Examiner* — Twyler L Haskins
*Assistant Examiner* — Akshay Trehan
(74) *Attorney, Agent, or Firm* — Volpe Koenig

(57) ABSTRACT

A camera and a method of counteracting an increase in humidity of a first air volume inside an enclosure of a camera, the increase in humidity being induced by a first electrical component being shifted from a first state to a second state being associated with an increase in heat dissipation from the first electrical component, the first electrical component directly or indirectly dissipating heat to the first air volume. The concept involves: temporarily decreasing, as the first electrical component is shifted the second state, electrical power consumption of a second electrical component having a variable electrical power consumption, the second electrical component directly or indirectly dissipating heat to the first air volume.

16 Claims, 4 Drawing Sheets

CAMERA AND A METHOD

FIELD OF INVENTION

The invention relates to a camera and to a method of counteracting an increase in humidity of an air volume inside a camera enclosure caused by a first electrical component being configured to be shifted from a first state to a second state, the second state being associated with an increase in heat dissipation from the first electrical component compared to the first state.

TECHNICAL BACKGROUND

EP 3 085 071 A1 discloses a thermal and power management system for use in a camera. The thermal and power management system is configured to control the operational parameters of various components inside the camera in order to keep the camera within a thermal budget and or within a power budget. The system is also configured to control the operational parameters in such a manner that any adverse impact on the user experience is minimized. Thus, this document relates to controlling temperature and power consumption, but it does not mention any problems or any suggestions concerning how to address issues related to humidity inside the camera.

It has been discovered that when power consumption of electrical components positioned inside an enclosure of a camera is increased, there is an increased tendency of condensation of water on the window of the enclosure, and especially in cold ambient environments. The condensation may remain several hours and obstruct the camera view. This issue is today addressed by providing active dryers and/or passive membranes capable of actively respectively passively venting moisture from the air inside the enclosure.

Alternatively, or as a complement, there is also provided heaters capable of heating the window and thereby reduce the tendency of condensation of water on the window of the enclosure. However, this increases the overall power consumption.

However, it has been discovered that when the power consumption of the electrical components positioned inside an enclosure of a camera is increased sharply, the current methods of venting moisture from the air inside the enclosure are not sufficiently efficient. One way to address this problem is to increase the available maximum drying capacity. However, this typically increases the overall size and cost of the camera.

Thus, there is still a need to address the issue that when power consumption of electrical components positioned inside an enclosure of a camera is increased, there is an increased tendency of condensation of water, which, e.g., may be problematic if it occurs on a window of the enclosure.

SUMMARY

Thus, providing a camera and a method addressing the issue that when power consumption of electrical components positioned inside an enclosure of a camera is increased, there is an increased tendency of condensation of water, would be beneficial.

This has been achieved by a camera comprising:

a first electrical component being configured to be shifted from a first state to a second state, the second state being associated with an increase in heat dissipation from the first electrical component compared to heat dissipation from the first electrical component in the first state, a second electrical component having a variable electrical power consumption, wherein the first electrical component and the second electrical component are at least partly arranged in an enclosure, the first electrical component and the second electrical component being configured to directly or indirectly dissipate heat to a first air volume inside the enclosure, and wherein the camera further comprises a controller arranged to temporarily decrease electrical power consumption of the second electrical component as the first electrical component is shifted to the second state, a first portion of a material having the property of being capable of absorbing water molecules when being cooled and desorbing water when being heated, and a second portion of a material having the property of being capable of absorbing water molecules when being cooled and desorbing water when being heated, wherein the first and second portions are provided as a part of the enclosure and/or inside the enclosure, wherein the first portion is positioned nearby the first electrical component and remote from the second electrical component, and the second portion is positioned nearby the second electrical component and remote from the first electrical component, whereby the controller temporarily decreasing electrical power consumption of the second electrical component counteracts an increase in humidity of the first air volume inside the enclosure, the increase in humidity being induced by the first electrical component being shifted to said second state and thereby heating the first portion of said material and counteracted by the second portion of said material being cooled and thereby absorbing water molecules from the first air volume.

One part of the present concept resides in a realization that some materials, such as many polymers, have a tendency to entrap water molecules and to release water molecules when being heated. Camera devices of today typically include polymer-based materials. Typically, at least parts of the enclosure, at least parts of a camera chassis, and at least parts of covers of electrical components include polymer-based materials. Polymers belong to a group of materials which typically entraps water molecules. Typically, when polymers are heated they release water molecules. As a camera typically comprises a significant number of parts of such polymers which release water molecules when heated, the absolute humidity of air volumes inside the enclosure will typically increase when the power consumption of the electrical components increases. Another part of the inventive concept resides in a realization that it is possible to make active use of the fact that some materials, such as many polymers, have the property of being capable of absorbing or desorbing water molecules when surrounding temperature or humidity level changes. In accordance with the present concept, there is especially made use of the fact that some materials, such as many polymers, has the property of being capable of absorbing water molecules when being cooled and desorbing water when being heated. By providing different portions of such materials as a part of the enclosure and/or inside the enclosure in combination with a clever controlling of the power consumption of different electrical components, and in combination with a specific positioning of the different portions of such materials and/or of the electrical components, the humidity problem has been addressed.

The shift of the first electrical component from a first state to a second state, the second state being associated with an increase in heat dissipation from the first electrical component compared to heat dissipation from the first electrical component in the first state, may refer to a situation where the first state is an off-state and the second state is an on-state or to a situation where the both the first and the second states are on-states; e.g. with the first state being a low power state and the second state being a high power state. The first electrical component may, e.g., be an IR LED element, where the first state is an off-state and the second state is an on-state. The first electrical component may be a heater. A heater is typically designed to be capable of being set at a plurality of different power levels. In one use scenario, the first state is an off-state and the second state is an on-state. In another use scenario, the first state is a low power on-state and the second state is a high power on-state.

The second electrical component having a variable electrical power consumption, may refer both to a second electrical component where the power consumption may be varied in a number of different levels, continuously or step-wise, but may also refer to a situation where the power consumption is varied only by being changed between an on-state and an off-state. The second electrical component may, e.g., be a step motor used to control focus and/or zoom of the camera and the electrical power consumption may be varied continuously, or in a plurality of different discrete values, e.g., by varying the hold current of the step motor. The step motor may also be referred to as a stepper motor or a stepping motor.

It may be noted that decreasing the consumption of the second electrical component as the first electrical component is shifted to the second state, is intended to refer to a simultaneity in practical terms. One way of controlling the camera is to provide the decrease in power consumption of the second electrical component in response to the shift in state of the first electrical component. However, it may be noted that it does not necessarily mean that the decrease must be provided after the shift; it is, e.g., conceivable that the electronic circuitry of the camera may form a decision of a forthcoming shift in state of the first electrical component and that the power consumption of the second electrical component is decreased in response to this decision such that the temperature of the second electrical component has begun to slightly decrease at the point in time when the shift in state of the first electrical component is actually performed. Thus, even if the timing does not need to be exactly the same, there should be a simultaneity such that the decrease in temperature of the second electrical component counteracts the increase in humidity induced by the first electrical component.

Reducing the electrical power consumption of the second electrical component and thereby reducing the temperature of the electrical component will also cause a reduction of a temperature of a material being positioned around, in contact with or at least nearby the second electrical component and being directly or indirectly in contact with an air volume such that the material, as the temperature reduces, absorbs moisture from the air volume. Nearby may be said to refer to material being so close or near the electrical component that activation of the electrical component causes the nearby material to be heated, such as by contact heating and radiation heating, by the electrical component such that the material dissipates heat to the first air volume. Being remote from the electrical component may be said to refer to materials being so far from the electrical component that the temperature of the material is to a greater extent controlled by another electrical component.

The second portion of said material being cooled and thereby absorbing water molecules from the first air volume may be referred to as a moisture trap.

It may be noted that the first portion of a material having the property of being capable of absorbing water molecules when being cooled and desorbing water when being heated, and the second portion of a material having the property of being capable of absorbing water molecules when being cooled and desorbing water when being heated, may be of the same kind of material or may be different materials as long as it has or they have the property of being capable of absorbing water molecules when being cooled and desorbing water when being heated. Other design parameters such as electrical insulation, load bearing capacity, transparency, etc, may be set in respect of the different portions based on their respective position in the camera. Thereby, there might be a need to provide different kinds of materials having different properties. It may also be noted that the first and the second portion of a material having the property of being capable of absorbing water molecules when being cooled and desorbing water when being heated, need not have the same rate of absorption and/or desorption at the same temperatures. It may even be suitable to have a first and a second portion having different temperature dependencies of the rates of absorption and/or desorption. With such a configuration it is possible to take into account situations where the first and second electrical components have different running temperatures, and/or where the first and second portions are influenced differently by the heat dissipation from the first, respectively, the second electrical component.

The first and second portions are provided as a part of the enclosure and/or inside the enclosure. In a first embodiment, the first and the second electrical components are both in direct contact with the first air volume in the sense that the respective electrical component as such or a part of a cover or shell of the respective electrical component is in direct contact and in fluid communication with air in the first air volume. The first air volume may also be referred to as a common air volume. The first and the second electrical components are arranged at a distance from each other such that material of the enclosure, and/or material being positioned inside the enclosure, having the property of being capable of absorbing water molecules when being cooled and desorbing water when being heated and which is positioned nearby the first electrical component is considered to be positioned remote to the second electrical component, and vice versa.

In a second embodiment, the first electrical component is in direct contact with the first air volume in the sense that the first electrical component as such or a part of a cover or shell of the electrical component is in direct contact and in fluid communication with air in the first air volume, whereas the second electrical component is in indirect contact with the first air volume in the sense that the second electrical component is in direct contact with a second air volume, the first air volume and the second air volume being separated from each other by a separation wall capable of transfer heat from the first air volume to the second air volume, or vice versa, and at least part of the separation wall being formed of a material having the property of being capable of absorbing water molecules when being cooled and desorbing water when being heated. The first electrical component is arranged at a distance from the separation wall such that material of the enclosure or inside the enclosure which has the property of being capable of absorbing water molecules when being cooled and desorbing water when being heated and which is considered positioned nearby the first electrical component is considered to be positioned remote from the separation wall, and vice versa. Alternatively, the configuration is the reversed with the second electrical component being in direct contact with the first air volume and the first electrical component being in indirect contact with the first air volume.

In a third embodiment, the first and the second electrical component are both in indirect contact with the first air volume in the sense that none of the respective electrical components as such nor any part of a cover or shell of the respective electrical component is in direct contact and in fluid communication with air in the first air volume, whereas both electrical components are in indirect contact with the first air volume in the sense that the respective electrical component is in direct contact with a respective air volume, the respective air volumes being separated from each other and from the first air volume by a respective separation wall capable of transfer heat from the respective air volume to the first air volume, or vice versa, the respective separation wall being formed of a material having the property of being capable of absorbing water molecules when being cooled and desorbing water when being heated. The first separation wall between the first air volume and the air volume associated with the first electrical component is arranged at a distance from the second separation wall between the first air volume and the air volume associated with the second electrical component such that the first separation wall is considered to be positioned remote from the second separation wall.

It may be noted that the respective air volumes being separated from each other does not necessarily mean that there is no fluid connection at all. It is sufficient that the respective air volumes are separated from each other to such an extent that the first air volume will be experiencing different portions where one piece of material, such as the first separation wall, increases in temperature and one piece of material, such as the second separation wall, decreases in temperature. However, when both electrical components are in only indirect contact with the first air volume it is preferred that there is no fluid connection between the respective air volumes associated with the first and the second electrical components, respectively.

The controller may be further arranged to restore electrical power consumption of the second electrical component after a predetermined time period or in response to a predetermined humidity condition related to the humidity of the first air volume inside the enclosure being fulfilled.

By restoring the electrical power consumption of the second electrical component after a predetermined time period, there is provided a robust manner of allowing the second electrical component to once again function as intended and/or to once again dry the second portion of the material having the property of being capable of absorbing water molecules when being cooled and desorbing water when being heated. It is conceivable to use only a predetermined time period as criterium for restoring electrical power consumption of the second electrical component.

By restoring the electrical power consumption of the second electrical component in response to a predetermined humidity condition being fulfilled, there is provided a well-controlled manner of allowing the second electrical component to once again function as intended and/or to once again dry the second portion of the material having the property of being capable of absorbing water molecules when being cooled and desorbing water when being heated, when the initial increase of humidity has once again been reduced to an allowable predetermined humidity condition. It is conceivable to use only a predetermined humidity condition as criterium for restoring electrical power consumption of the second electrical component.

It is conceivable to use a combination of a predetermined time period and a predetermined humidity condition. In one such embodiment it is conceivable that any one of the criteria may be used to trump the other one.

The enclosure may comprise a window. One side of the window may face the first air volume inside the enclosure. Moreover, as a complement or as an alternative, the window may be in fluid communication with the first air volume inside the enclosure. In fluid communication with the first air volume is intended to refer to situations where the air of the first air volume inside the enclosure may flow through the camera such that there is formed a direct contact of the air with the window. This may be in the form of the window forming part of a main vessel enclosing the first air volume or the window forming part of a secondary vessel forming a communicating vessel with the main vessel.

It may be noted that the concept disclosed is useful to reduce condensation of moisture on a window of an enclosure. It is not only suitable for cases where the window faces the first air volume, but the concept is considered especially useful for designs where the window faces the first air volume. Similarly, it is not only suitable for cases where the window is in fluid communication with the first air volume, but the concept is considered especially useful for designs where the window is in fluid communication with the first air volume inside the enclosure. The concept is considered especially useful for designs where the window is a window through which the camera is designed to view a scene.

The first electrical component may be selected from a group consisting of: an electrical motor, such as an electrical step motor, a heater, a lighting element, such as an IR LED element, and a resistor.

These electrical components are electrical components that often require relatively rapid increase in electrical power consumption and which thereby may induce an increase in humidity of the first air volume inside the enclosure.

The second electrical component may be selected from a group consisting of: an electrical motor, such as an electrical step motor, a heater, and a resistor.

These electrical components are typically capable of providing heat and are thereby capable of drying the second portion of the material having the property of being capable of absorbing water molecules when being cooled and desorbing water when being heated. Alternatively expressed, these electrical components are typically capable of reducing their temperature when their power consumption is decreased, whereby the second portion of the material, having the property of being capable of absorbing water molecules when being cooled and desorbing water when being heated, may be cooled such that it absorbs water molecules.

In case of an electrical motor, such as an electrical step motor, the electrical power consumption may be decreased by decreasing a hold current of the motor. In case of a heater or a resistor, the electrical power consumption may be decreased by decreasing the voltage and/or the current across the heater or resistor.

At least the second portion may be formed of a polymer-based material.

The polymer-based material of the second portion may form part of a cover of the electrical component. The polymer-based material of the second portion may form part of an attachment by which the electrical component is attached to the enclosure or to a camera chassis inside the enclosure. The polymer-based material of the second portion may form part of the enclosure. In practice also the first portion of said material is formed of a polymer-based material since it is as such useful as a cover or as part of an attachment of the first electrical component.

Suitable materials to use are, e.g., polycarbonate; PC, as such or in combination with other polymers, such as polycarbonate and acrylonitrile butadiene styrene; PC+ABS, polycarbonate and polybutylene terephthalate; PC+PBT, polyamide; PA, acrylonitrile styrene acrylate; ASA.

The controller may be configured to activate the second electrical element for a predetermined time period before it is contemplated to shift the first electrical component from the first state to the second state.

Thereby, it is possible to in a sense prepare the second portion of material such that it is comparably dry and comparably hot such that it will cool and absorb water molecules in response to the electrical power consumption of the second electrical component being decreased. It may be noted that the pre-heating may be performed smoothly such that any ordinary drying capacity of the camera is capable of taking care of the moisture induced by this pre-heating.

The pre-heating may be an additional pre-heating not explicitly warranted by the ordinary function of the camera. Alternatively, or as a complement, the ordinary function of some of the electrical components of the camera may be regarded as a pre-heating. It is e.g. typical to provide a hold current to a step motor controlling e.g. the focus and/or zoom of the camera. This hold current provides in a sense a pre-heating which is also part of the ordinary function of the camera. It may be noted that it is also contemplated to increase the power consumption of the second electrical element for a pre-determined time period before it is contemplated to shift the first electrical component from the first state to the second state. It is, e.g., conceivable to increase the hold current of a step motor from a level determined by the ordinary function of the camera to a higher level and thereby making the step motor to heat the second portion of material to a greater extent compared to what is accomplished by the hold current determined by the ordinary function of the camera.

As an alternative or complement to the pre-heating it is also contemplated that the controller may be configured to keeping track of electrical power consumption of different electrical components of the camera and decreasing electrical power consumption of an electrical component which recently has had an electrical power consumption above a predetermined threshold value at which the electrical component has dissipated heat and dried and heated a piece of material having the property of being capable of absorbing water molecules when being cooled and desorbing water when being heated. Thus, the second electrical component will be determined dynamically based on the recent usage of the different electrical components of the camera.

The second portion may be provided in the form of a moisture absorption element or the camera may further comprise a moisture absorption element, the moisture absorption element being arranged to absorb moisture from the first air volume when decreasing in temperature, the moisture absorption element being located nearby the second electrical component such that the temperature of the moisture absorption element decreases in response to a decrease in power consumption of the second electrical element.

Suitable materials to use in such an absorption element is e.g. molecular sieve, silica gel, montmorillonite clay, calcium oxide; CaO, and calcium sulphate; $CaSO_4$.

The above mentioned benefits have also been achieved by a method of counteracting an increase in humidity of a first air volume inside an enclosure of a camera, the increase in humidity being induced by a first electrical component being shifted from a first state to a second state, the second state being associated with an increase in heat dissipation from the first electrical component compared to heat dissipation from the first electrical component in the first state, the first electrical component being at least partly positioned in the enclosure and being configured to directly or indirectly dissipate heat to the first air volume inside the enclosure, the method comprising:

temporarily decreasing, as the first electrical component is shifted the second state, electrical power consumption of a second electrical component having a variable electrical power consumption, the second electrical component being at least partly arranged in the enclosure and being configured to directly or indirectly dissipate heat to the first air volume inside the enclosure.

The controller temporarily decreasing electrical power consumption of the second electrical component counteracts an increase in humidity of the first air volume inside the enclosure, the increase in humidity being induced by the first electrical component being shifted to said second state and thereby heating a first portion of a material, the first portion having the property of being capable of absorbing water molecules when being cooled and desorbing water when being heated, and the increase in humidity being counteracted by a second portion of a material having the property of being capable of absorbing water molecules when being cooled and desorbing water when being heated being cooled and thereby absorbing water molecules from the first air volume, wherein the first portion is positioned nearby the first electrical component and remote from the second electrical component, and the second portion is positioned nearby the second electrical component and remote from the first electrical component.

The advantages associated with the different features defined in the method has been discussed in detail with reference to the camera and the advantages associated with the different features are equally applicable in respect of the method. It may also be noted that preferred embodiments and details discussed in relation to the camera are equally applicable to the method.

The method may further comprise: restoring electrical power consumption of the second electrical component after a predetermined time period and/or in response to a predetermined humidity condition related to the humidity of the first air volume inside the enclosure being fulfilled.

The method may be used to counteract condensation of moisture on a window forming part of the enclosure. The window may have one side facing the first air volume inside the enclosure. The window may be in fluid communication with the first air volume inside the enclosure.

The method may further comprise selecting the first electrical component from a group consisting of: an electrical motor, such as an electrical step motor, a heater, a lighting element, such as an IR LED element, and a resistor.

The method may further comprise selecting the second electrical component from a group consisting of: an electrical motor, such as an electrical step motor, a heater, and a resistor.

The method may further comprise: activating the second electrical component for a predetermined time period before it is contemplated to shift the first electrical component from the first state to the second state.

The method may further comprise: providing a moisture absorption element, being arranged to absorb moisture from the first air volume when decreasing in temperature, nearby the second electrical component such that the temperature of the moisture absorption element decreases in response to a decrease in power consumption of the second electrical element. Alternatively, this may be referred to as; the method may further comprise: positioning a moisture absorption element, being arranged to absorb moisture from the first air volume when decreasing in temperature, nearby the second electrical component such that the temperature of the moisture absorption element decreases in response to a decrease in power consumption of the second electrical element.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

The concepts may also in short be said to relate to a camera and a method of counteracting an increase in humidity of a first air volume inside an enclosure of a camera, the increase in humidity being induced by a first electrical component being shifted from a first state to a second state being associated with an increase in heat dissipation from the first electrical component, the first electrical component directly or indirectly dissipating heat to the first air volume, the method comprising: temporarily decreasing, as the first electrical component is shifted the second state, electrical power consumption of a second electrical component having a variable electrical power consumption, the second electrical component directly or indirectly dissipating heat to the first air volume.

BRIEF DESCRIPTION OF THE DRAWINGS

The concepts will by way of example be described in more detail with reference to the appended schematic drawings, which show various embodiments.

DETAILED DESCRIPTION

Figure 1:
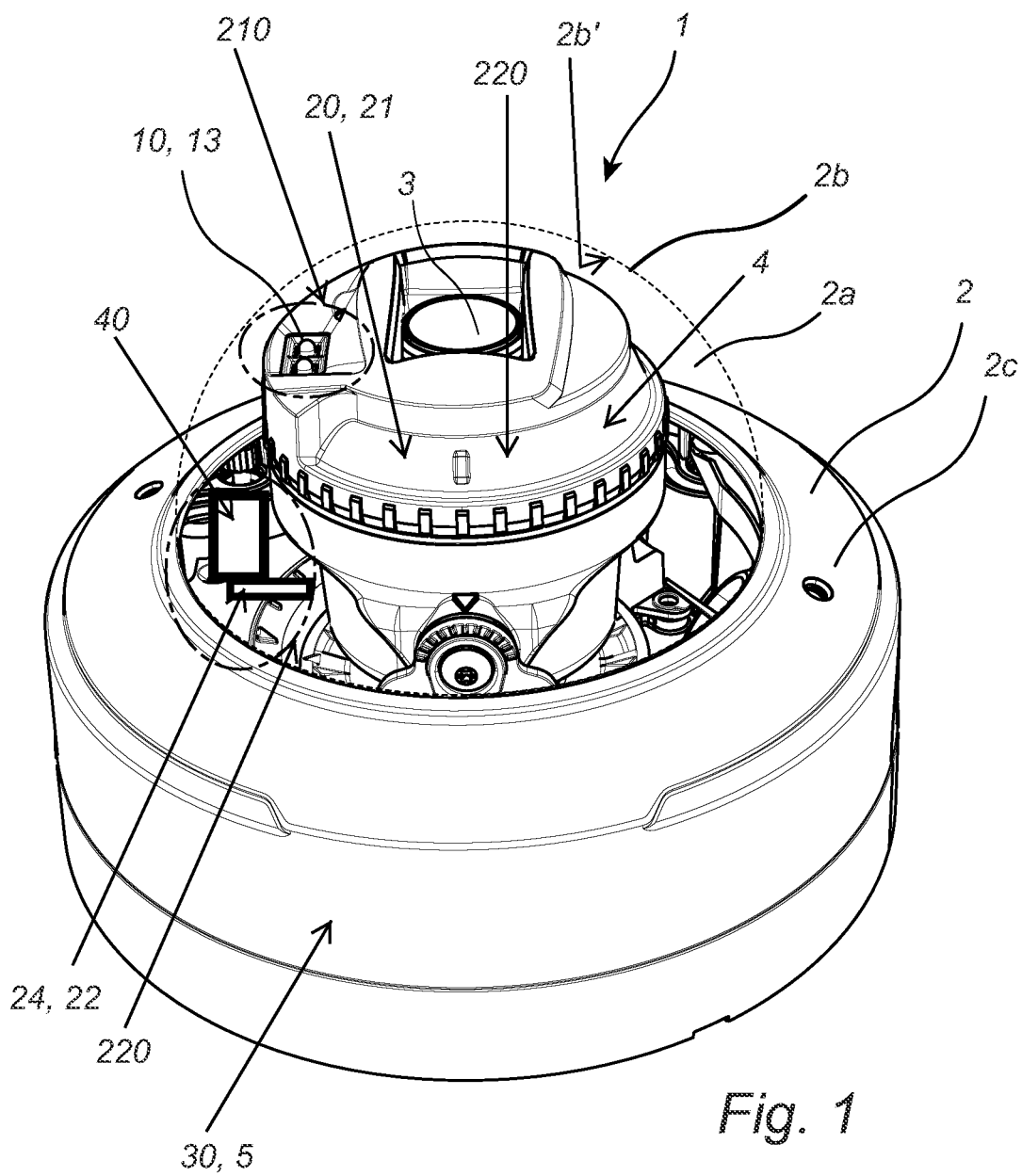
FIG. 1 discloses a first kind of camera in which the inventive concept has been included.
Figure 2A:
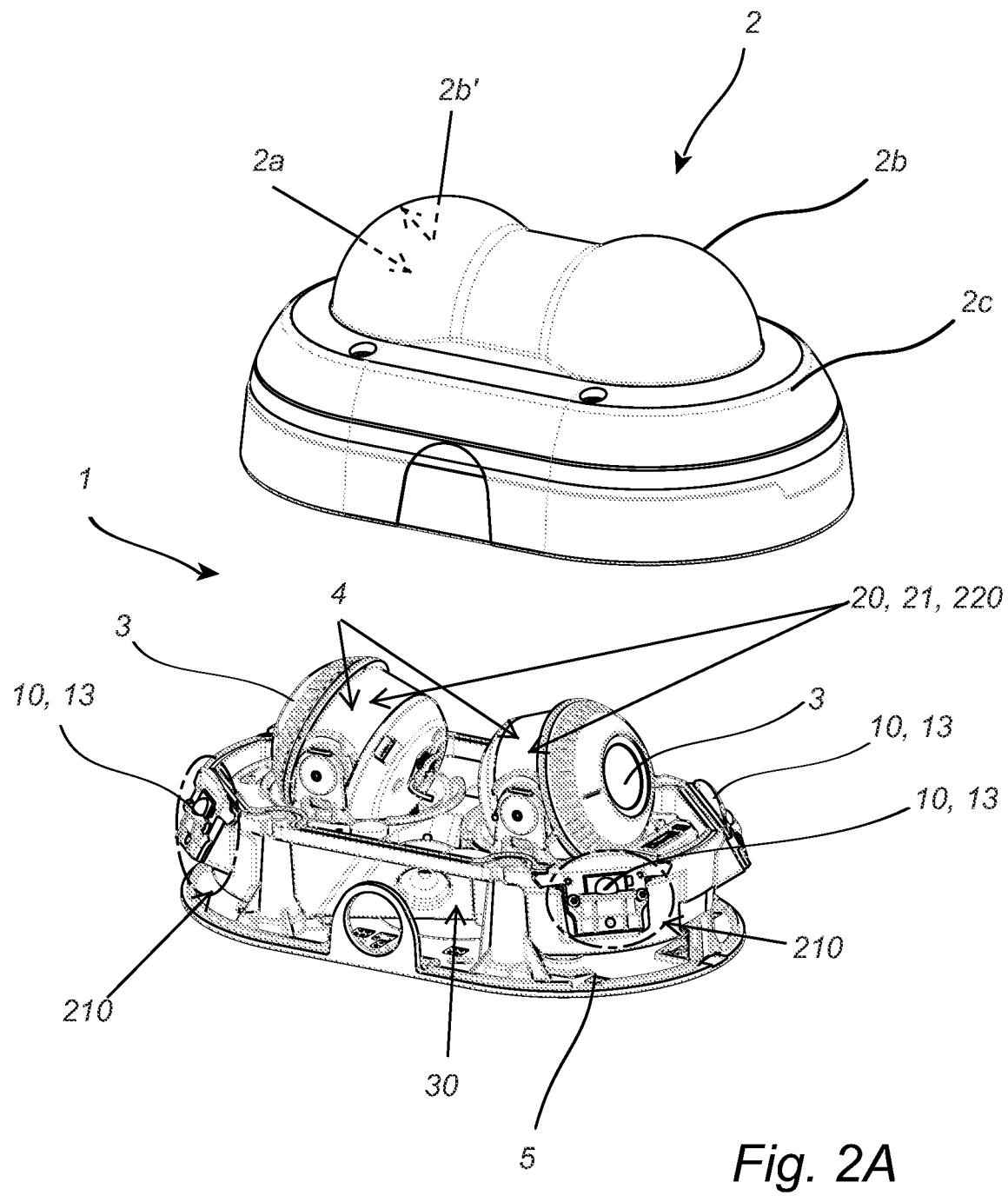
FIGS. 2A and 2B disclose in two different exploded views a second kind of camera in which the inventive concept has been included.
Figure 2B:
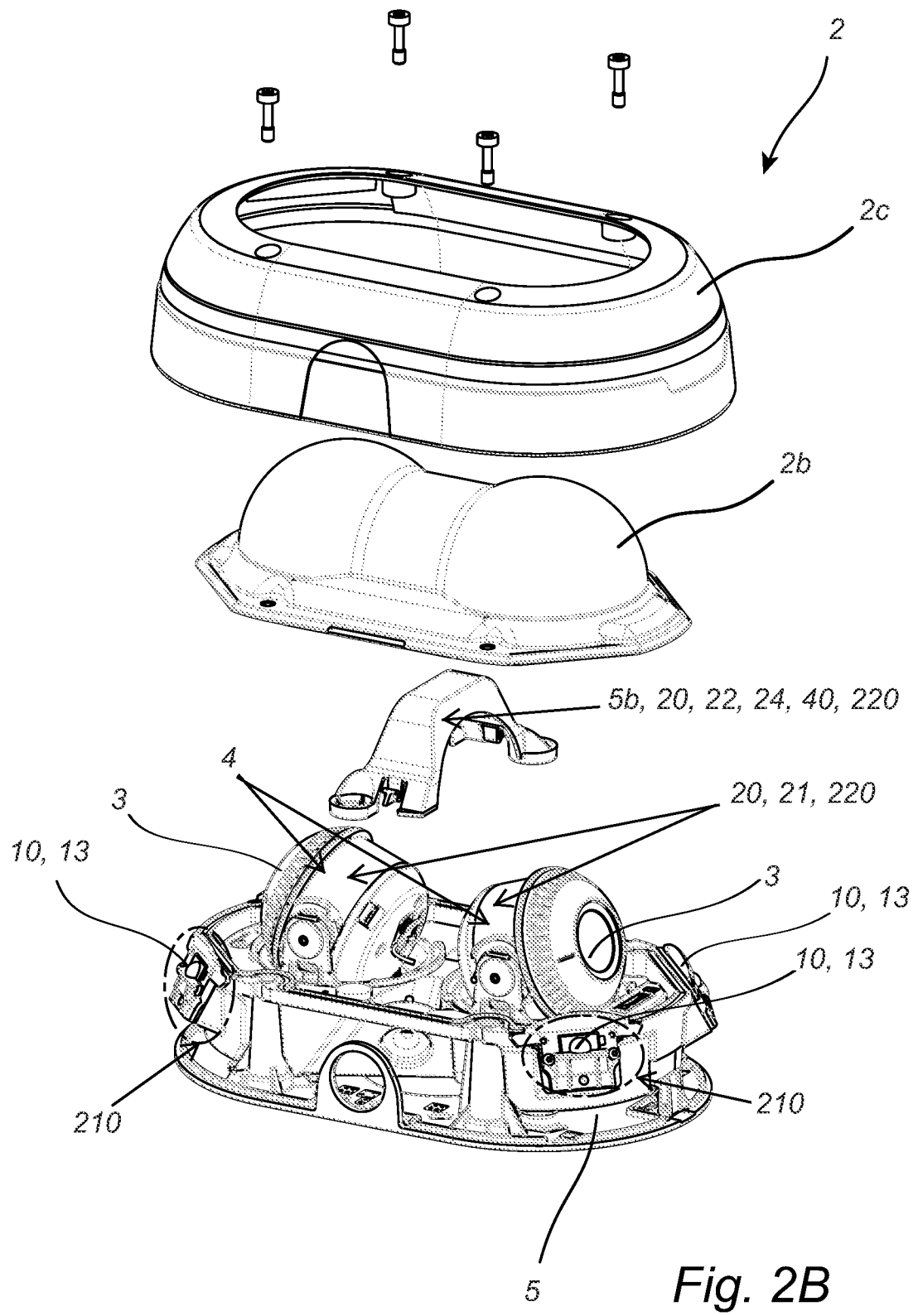

With reference to FIGS. 1, 2A and 2B, there are disclosed two different cameras in which the concepts have been included. In the drawings and in the description, the same reference numerals will be used for the corresponding features of the two cameras.

In FIG. 1, there is disclosed a camera 1 in which the electronic circuitry and optics 3 of the camera 1 is enclosed in an enclosure 2. The enclosure 2 comprises a base part 2c and a window 2b. The window 2b is transparent such that light from the scene may enter through the window 2b, through the optics 3 to an image sensor (not shown).

The imaging function of the optics 3, the image sensor, the electronic circuitry, etc. of the camera 1 is well-known to a person skilled in the art. Moreover, the specific choice of design of the imaging function of the camera 1 is not a crucial part of the inventive concept.

The optics 3 and the image sensor is provided in an inner housing 4 positioned inside the enclosure 2. The inner housing 4 is supported by a chassis 5 inside the enclosure 2. The inner housing 4 is typically movable relative to the chassis 5 and the enclosure 2, such that the optics 3 and the image sensor may be oriented in different directions. However, the concepts are equally applicable for designs where the optics 3 are fixed relative to the chassis 5 and enclosure 2.

In FIGS. 2A and 2B, there is disclosed a variant of the camera 1 where there are two inner housings 4 provided inside a single enclosure 2 having a base part 2c and a window 2b. Each inner housing 4 is provided with its own optics 3 and its own image sensor.

Both cameras 1 of FIG. 1 and of FIGS. 2A-2B, are provided with a lighting element in the form of IR LED elements 13. The IR LED elements 13 are arranged inside the enclosure 2. In the camera 1 of FIG. 1, the IR LED elements 13 are provided on the inner housing 4. Thus, the IR LED elements 13 will be given different orientations relative to the enclosure 2. In the camera 1 of FIGS. 2A-2B, the IR LED elements 13 are provided on the chassis 5 of the camera 1. In the camera 1 of FIGS. 2A-2B, there are two IR LED elements 13 associated with each inner housing 4.

The IR LED elements 13 are examples of a first electrical component 10, as referred to in a general description of the inventive concept. The IR LED elements 13 are typically in an off-state, also referred to as a first state 10S1, during daytime and set in an on-state, also referred to as a second state 10S2, during night-time to illuminate the scene such that an IR sensitive image sensor may depict the scene. When the IR LED elements 13 are set in an on-state, they will become warm and heat will be dissipated from the IR LED elements 13.

In the camera 1 of FIG. 1, the heat will be dissipated to the air 2a inside the enclosure 2 and also to the portion 210 of the inner housing 4 nearby the LED elements 13. In the camera 1 of FIGS. 2A-2B, the heat will be dissipated to the air 2a inside the enclosure 2 and also to the portions 210 of the chassis 5 nearby the IR LED elements 13. The inner housing 4 and the chassis 5 typically comprise materials having the property of being capable of absorbing water molecules when being cooled and desorbing water when being heated. The materials typically include polymer-based materials. Thus, the activation of the IR LED elements 13 have, as such, a tendency to induce an increase in absolute humidity of the air 2a inside the enclosure since the activation of the IR LED elements 13 causes heating of the first portion 210 nearby the respective IR LED element 13, such that the material at the first portion 210 desorbs water into the air 2a.

The camera 1 typically also comprises one or more electrical motors 21 positioned inside the inner housing 4, and thus also inside the enclosure 2. The electrical motors 21 are provided to move different parts of the optics 3 relative to each other and/or relative to the image sensor to thereby control zoom and/or focus of the camera 1. The electrical motors are typically so-called step motors 21, also known as stepper motors or stepping motors. To keep the position of the optics 3, the step motor 21 is kept in position, i.e., in its current step, by constantly providing a hold current to the step motor 21. This hold current may be varied, optionally between different predetermined hold current levels, and as long as the hold current is above a minimum hold current, the position of the step motor 21 is kept. The minimum hold current may be set to different values for different camera types. The hold current of the step motor 21 may be set above the minimum value as a safety measure to secure correct positioning of the optics 3, as a measure of heating the camera 1, or for other reasons. As will be apparent from the description below, the hold current of the step motor 21 may also be set above the minimum value as a pre-heating step forming part of the inventive concept.

The electrical motors 21 are examples of a second electrical component 20, as referred to in a general description of the concept. The hold current provided to the step motor 21 will cause heating of the step motor 21. This heat will be dissipated to the housing 4 and to the air 2a inside the enclosure 2. As mentioned above, the inner housing 4 typically comprises materials having the property of being capable of absorbing water molecules when being cooled and desorbing water when being heated.

The camera 1 further comprises a controller 30 configured to control the power consumption of the second electrical component 20, such as the step motor 21. The controller 30 is configured to temporarily decrease the hold current of the step motor 21 as the IR LED elements 13 are being activated. In general terms, this is referred to as the controller 30 being arranged to temporarily decrease electrical power consumption of the second electrical component 20 as the first electrical component 10 is shifted to the second state 10S2. The result of this reduction in power consumption of the step motor 21 is that there is a reduction in heat being dissipated to the inner housing 4 and thereby the temperature of the inner housing 4 will decrease. Thus, the result of the temporary decrease of electrical power consumption of the second electrical component 20 is that a second portion 220, formed of the inner housing 4, of a material having the property of being capable of absorbing water molecules when being cooled and desorbing water when being heated, is cooled and thereby absorbs water molecules from the air 2a.

It may be noted that although the first portion 210 and the second portion 220 both form part of the inner housing 4 in the camera 1 of FIG. 1, the first portion 210 is positioned nearby the first electrical component 10 and remote from the second electrical component 20, and the second portion 220 is positioned nearby the second electrical component 20 and remote from the first electrical component 10.

It may be noted that in the camera 1 of FIGS. 1 and 2A-2B, the enclosure 2, including the window 2b, encloses the first and second electrical component 10, 20 and the first and the second portion 210, 220, such that an inside 2b' of the window 2b faces, and is in fluid communication with, the air volume 2a inside the enclosure 2.

In FIG. 1, there is also disclosed a moisture absorption element 40. The moisture absorption element 40 is arranged to absorb moisture from the air volume 2a inside the enclosure 2 when decreasing in temperature. The moisture absorption element 40 is located nearby a second electrical component 20 such that the temperature of the moisture absorption element 40 decreases in response to a decrease in power consumption of the second electrical element 20. In the example shown in FIG. 1, the moisture absorption element 40 is positioned nearby a heater 22 or resistor 24, which may be said to act as a second electrical component 20. Suitable materials to use in such an absorption element is, e.g., molecular sieve, silica gel, montmorillonite clay, calcium oxide; CaO, and calcium sulphate; $CaSO_4$. The moisture absorption element 40 may be a separate element 40 as shown in FIG. 1. Alternatively, or as a complement, the moisture absorption element 40 may form an integral part of or may be attached to a part of the camera 1, such as to the chassis 5, to the inner housing 4, or to the enclosure 2, such as the base part 2c of the enclosure 2. It should also be noted that the moisture absorption element 40 may also be referred to as a second portion 220. In the camera 1 of FIGS. 2A-2B, there is, e.g., a bridging element 5b, which could be used as a part of the chassis 5, but also be used as a carrier of a moisture absorption element 40 and a resistor 24 or heater 22 and thereby also be referred to as a second portion 220.

Figure 3:
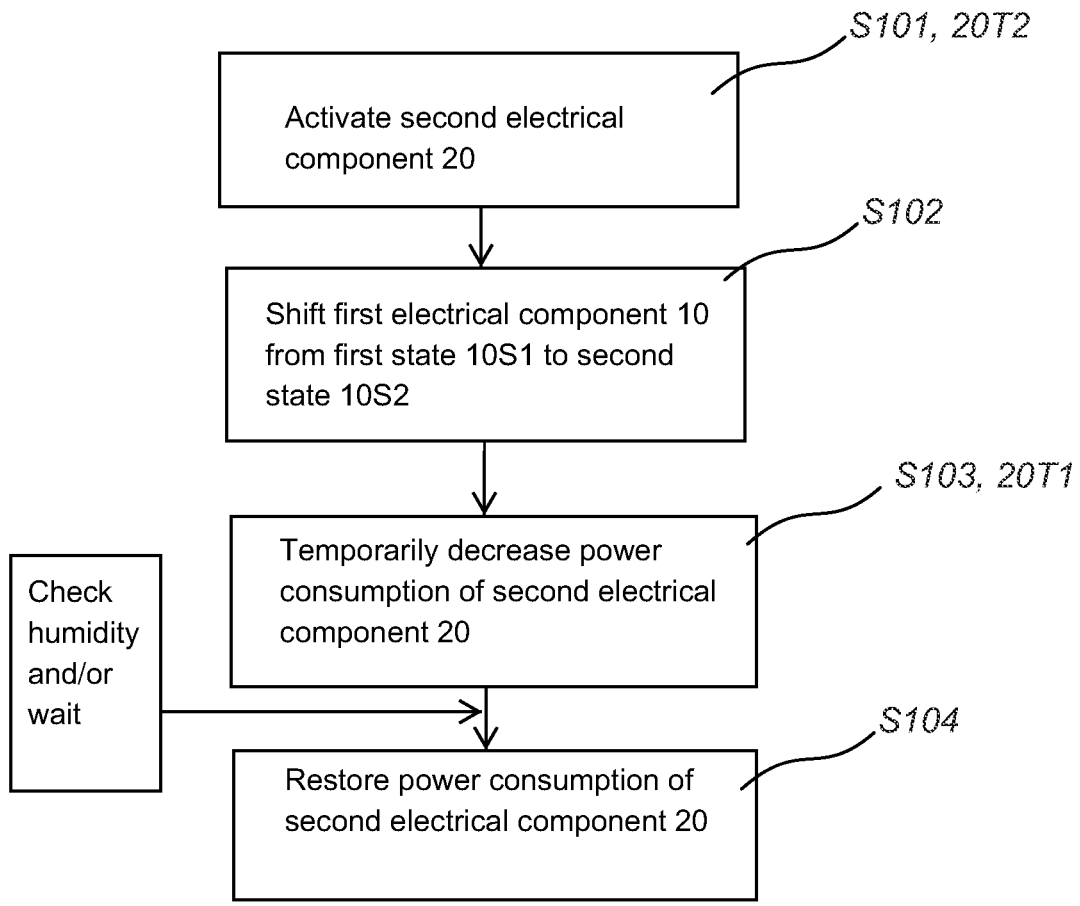
FIG. 3 is a schematic diagram over a method according to which the inventive concept may be accomplished.

The concepts herein will also be exemplified with reference to FIG. 3 in which a schematic flow chart is shown.

The controller 30 is configured to in step S101 activate the second electrical element 20 for a predetermined time period 20T2 before it is contemplated to shift the first electrical component 10 from the first state 10S1 to the second state 10S2. This activation may be a specific activation provided in response to a contemplated shift. The specific activation may alternatively be dispensed with in case it is known that there is already an electrical component running with a power consumption sufficient for that electrical component to heat a second portion 220 such that the power consumption could be decreased, and such that the electrical component in question could act as said second electrical component 20. Irrespective of the circumstances of the activation of the second electrical component 20, this activation of the second electrical element 20 for a predetermined time period 20T2 before it is contemplated to shift the first electrical component 10 from the first state 10S1 to the second state 10S2 may be referred to as a pre-heating of the second portion 220.

In step S102, the first electrical component 10, such as the IR LED element 13, is shifted from an off-state 10S1 to an on-state 10S2.

In step S103, electrical power consumption of the second electrical component 20, such as the step motor 21, the heater 22 or the resistor 24 close to the moisture absorption element 40, is temporarily decreased.

It may be noted that there is a simultaneity of steps S102 and S103. One way of controlling the camera is to provide the decrease in power consumption of the second electrical component 20 in response to the shift in state of the first electrical component 10. However, it may be noted that it does not necessarily mean that the decrease S103 must be provided after the shift S102; it is, e.g., conceivable that the electronic circuitry, such as the controller 30, of the camera 1 may form a decision of a forthcoming shift in state of the first electrical component 10 and that the power consumption of the second electrical component 20 is decreased in response to this decision such that the temperature of the second electrical component 20 has begun to slightly decrease at the point in time when the shift in state of the first electrical component is actually performed. Thus, the order of steps S102 and S103 may be the reversed compared to the one indicated in FIG. 3. In summary, even if the timing does not need to be exactly the same, or the order need to be in a specific order, there should be a simultaneity such that the decrease in temperature of the second electrical component 20 counteracts the increase in absolute humidity induced by the first electrical component 10.

After a predetermined time period 20T1 has passed or in response to a predetermined humidity condition HC being fulfilled, the electrical power consumption of the second electrical component 20 is once again restored in step S104, i.e., the power consumption is restored to as it was before the decrease of step S103. The humidity condition HC is typically related to the relative humidity in the air 2a. It should be noted that this step S104 may be dispensed with in case the other functionalities of the camera 1 does not necessitate this step. This is, e.g., especially true in case the second electrical component 20 is a heater 22 or resistor 24 which is activated as a specific pre-heating step for a predetermined time period 20T2 before it is contemplated to shift the first electrical component 10 from the first state 10S1 to the second state 10S2. In such a case, the step S104 is dispensed with and the second electrical component 20 is not activated until it is anew contemplated to provide a new shift in state of the first electrical component 10. In the example of the first electrical component 10 being IR LED element 13, the heater 22 or resistor 24 is activated at a predetermined time, in the order of one or two hours, before dusk such that the second portion 220 or moisture absorption element 40 is pre-heated and ready to be cooled. As the IR LED element 13 is shifted to an on-state, the heater 22 or resistor 24 is shut down and the second portion 220 or moisture absorption element 40 act as a moisture trap and absorbs the water molecules desorbed by the first portion 210 nearby the IR LED element 13. At dawn, the IR LED element 13 is shifted to an off-state.

Although different examples have been disclosed, it may be summarized that the first electrical component 10 is preferably selected from a group consisting of: an electrical motor 21, such as an electrical step motor, a heater 22, a lighting element 13, such as an IR LED element, and a resistor 24.

In this context it may also be noted that irrespective of the first state is an off-state or an on-state, the concepts herein address the case where the second state 10S2 is associated with an increase in heat dissipation from the first electrical component 10 compared to heat dissipation from the first electrical component 10 in the first state 10S1.

Although different examples have been disclosed, it may be summarized that the second electrical component 20 is preferably selected from a group consisting of: an electrical motor 21, such as an electrical step motor, a heater 22, and a resistor 24.

It should be noted that variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Thus, it is contemplated that there are numerous modifications of the embodiments described herein, which are still within the scope of the concepts as defined by the appended claims.

The invention claimed is:

1. A camera comprising:
   a first electrical component being configured to be shifted from a first state to a second state, the second state being associated with an increase in heat dissipation from the first electrical component compared to heat dissipation from the first electrical component in the first state,
   a second electrical component having a variable electrical power consumption,
   wherein the first electrical component and the second electrical component are at least partly arranged in an enclosure, the first electrical component and the second electrical component being configured to directly or indirectly dissipate heat to a first air volume inside the enclosure, and
   wherein the camera further comprises:
      a controller arranged to temporarily decrease electrical power consumption of the second electrical component as the first electrical component is shifted to the second state,
      a first portion of a material having the property of being capable of absorbing water molecules when being cooled and desorbing water when being heated, and
      a second portion of a material having the property of being capable of absorbing water molecules when being cooled and desorbing water when being heated,
      wherein the first and second portions are provided as a part of the enclosure and/or inside the enclosure,
      wherein the first portion is positioned nearby the first electrical component and remote from the second electrical component, and the second portion is positioned nearby the second electrical component and remote from the first electrical component,
      whereby the controller temporarily decreases electrical power consumption of the second electrical component counteracts an increase in humidity of the first air volume inside the enclosure, the increase in humidity being induced by the first electrical component being shifted to said second state and thereby heating the first portion of said material and counteracted by the second portion of said material being cooled and thereby absorbing water molecules from the first air volume.

2. The camera according to claim 1, wherein the controller restores electrical power consumption of the second electrical component after a predetermined time period or in response to a predetermined humidity condition related to the humidity of the first air volume inside the enclosure being fulfilled.

3. The camera according to claim 1, wherein the enclosure comprises a window, wherein one side of the window optionally faces, and is optionally in fluid communication with, the first air volume inside the enclosure.

4. The camera according to claim 1, wherein the first electrical component is selected from a group consisting of: an electrical motor, such as an electrical step motor, a heater, a lighting element, such as an IR LED element, and a resistor.

5. The camera according to claim 1, wherein the second electrical component is selected from a group consisting of: an electrical motor, such as an electrical step motor, a heater, and a resistor.

6. The camera according to claim 1, wherein at least the second portion is formed of a polymer-based material.

7. The camera according to claim 1, wherein the controller activates the second electrical component for a predetermined time period before it is contemplated to shift the first electrical component from the first state to the second state.

8. The camera according to claim 1, wherein the second portion comprises a moisture absorption material or the camera further comprises a moisture absorption material, the moisture absorption material absorbing moisture from the first air volume when decreasing in temperature, the moisture absorption material being located nearby the second electrical component such that the temperature of the moisture absorption material decreases in response to a decrease in power consumption of the second electrical component.

9. A method of counteracting an increase in humidity of a first air volume inside an enclosure of a camera, the increase in humidity being induced by a first electrical component being shifted from a first state to a second state, the second state being associated with an increase in heat dissipation from the first electrical component compared to heat dissipation from the first electrical component in the first state, the first electrical component being at least partly positioned in the enclosure and being configured to directly or indirectly dissipate heat to the first air volume inside the enclosure, the method comprising:
- temporarily decreasing, as the first electrical component is shifted the second state, electrical power consumption of a second electrical component having a variable electrical power consumption, the second electrical component being at least partly arranged in the enclosure and being configured to directly or indirectly dissipate heat to the first air volume inside the enclosure,
- the controller temporarily decreasing electrical power consumption of the second electrical component counteracts an increase in humidity of the first air volume inside the enclosure, the increase in humidity being induced by the first electrical component being shifted to said second state and thereby heating a first portion of a material, the first portion having the property of being capable of absorbing water molecules when being cooled and desorbing water when being heated, and the increase in humidity being counteracted by a second portion of a material having the property of being capable of absorbing water molecules when being cooled and desorbing water when being heated being cooled and thereby absorbing water molecules from the first air volume,
- wherein the first portion is positioned nearby the first electrical component and remote from the second electrical component, and the second portion is positioned nearby the second electrical component and remote from the first electrical component.

10. The method according to claim 9, further comprising: restoring electrical power consumption of the second electrical component after a predetermined time period or in response to a predetermined humidity condition related to the humidity of the first air volume inside the enclosure being fulfilled.

11. The method according to claim 9, wherein the method is used to counteract condensation of moisture on a window forming part of the enclosure and having one side optionally facing, and optionally is in fluid communication with, the first air volume inside the enclosure.

12. The method according to claim 9, further comprising selecting the first electrical component from a group consisting of: an electrical motor, such as an electrical step motor, a heater, a lighting element, such as an IR LED element, and a resistor.

13. The method according to claim 9, further comprising selecting the second electrical component from a group consisting of: an electrical motor, such as an electrical step motor, a heater, and a resistor.

14. The method according to claim 9, further comprising: activating the second electrical component for a predetermined time period before it is contemplated to shift the first electrical component from the first state to the second state.

15. The method according to claim 9, further comprising: providing a moisture absorption material, being arranged to absorb moisture from the first air volume when decreasing in temperature, nearby the second electrical component such that the temperature of the moisture absorption element decreases in response to a decrease in power consumption of the second electrical component.

16. A camera comprising:
- a first electrical component, which dissipates heat, configured to be shifted from a first state to a second state, the second state comprising increased heat dissipation from the first state,
- a second electrical component having a variable electrical power consumption,
- the first and second electrical components being at least partly arranged in an enclosure, and configured to directly or indirectly dissipate heat to a first air volume inside the enclosure, and
- the camera further comprising:
  - a controller which temporarily decreases electrical power consumption of the second electrical component as the first electrical component is shifted to the second state,
- first and second portions of a material being capable of absorbing water molecules when cooled and desorbing water molecules when heated, and
- wherein the first and second portions are part of the enclosure and/or inside the enclosure,
- wherein the first portion is positioned closer to the first electrical component than the second electrical component, and the second portion is positioned closer to the second electrical component than the first electrical component,
- whereby the controller temporarily decreases electrical power consumption of the second electrical component to cool the second portion of said material being and thereby absorb water molecules from the first air volume, to counteract an increase in humidity of the first air volume inside the enclosure, in response to the increase in humidity being induced by the first electrical component being shifted to said second state and thereby heating the first portion of said material.

* * * * *